United States Patent
Donald et al.

(10) Patent No.: US 7,319,640 B1
(45) Date of Patent: Jan. 15, 2008

(54) NOISE SUPPRESSION SYSTEM

(75) Inventors: James B. Donald, Pawcatuk, CT (US); Albert H. Nuttall, Old Lyme, CT (US); James H. Wilson, San Clemente, CA (US)

(73) Assignee: The United States of America represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/484,149

(22) Filed: Jun. 26, 2006

(51) Int. Cl.
*G01S 3/86* (2006.01)

(52) U.S. Cl. .................. 367/124; 367/118; 367/901

(58) Field of Classification Search ............... 367/118, 367/119, 124, 129, 901
See application file for complete search history.

(56) References Cited

U.S. PATENT DOCUMENTS

| | | | | |
|---|---|---|---|---|
| 5,216,640 A | * | 6/1993 | Donald et al. ............. | 367/124 |
| 5,481,505 A | * | 1/1996 | Donald et al. ............. | 367/124 |
| 5,914,912 A | * | 6/1999 | Yang ......................... | 367/119 |
| 6,980,486 B1 | * | 12/2005 | Kneipfer et al. ............ | 367/129 |

* cited by examiner

*Primary Examiner*—Ian J. Lobo
(74) *Attorney, Agent, or Firm*—James M. Kasischke; Michael P. Stanley; Jean-Paul A. Nasser

(57) ABSTRACT

A method and apparatus is provided for suppressing noise which includes receiving a plurality of signals from an array of sensors and transforming each of these signals to the frequency domain. The transformed signals are beamformed so that noise sources can be identified by bearing and frequency range. A planewave-fit noise-suppression routine is then used to remove identified noise sources from the transformed signals and to provide a noise-suppressed transformed signal having signals from said identified noise sources suppressed.

7 Claims, 2 Drawing Sheets

NOISE SUPPRESSION SYSTEM

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION (1) Field of the Invention

The present invention generally relates to sonar systems and more specifically to sonar systems particularly adapted for identifying the location of an underwater object(s).

(2) Description of the Prior Art

Conventional passive sonar systems detect acoustic signals emanating from an underwater object; that is, any device that moves through the water while emitting acoustic signals that sonar can detect. Torpedoes and submarines are examples of such underwater objects.

As modern, very quiet submarine platforms become operational in large numbers, new methods of detecting very low level signals from these quiet submarine platforms are desired, especially in the presence of high noise levels from surface shipping, wind biologics, and other sources of ambient noise.

Ambient noise from all these sources can be very loud, especially in coastal waters where surface ship densities are largest, and these loud noise signals can prevent the detection of weaker signals of interest. It is therefore, highly desirable to suppress the unwanted noises in order to better detect and track the signal(s) of interest. Noise must be suppressed coherently by estimating both the phases and amplitudes of the noise sources desired to be suppressed. This can be accomplished prior to the beamforming process, during the beamforming process, or in the post-beamforming process. Prior to beamforming, digital time series data sets from the hydrophone array are decimated, filtered, and heterodyned to prepare the multiple time series data sets to be transformed to the frequency domain utilizing a Fast Fourier Transform routine. Fourier transformed frequency domain data sets, commonly referred to as "hydrophone FFTs," are then beamformed by using any one of numerous beamforming algorithms. A particular beamforming algorithm, called the Fourier Integral Method (FIM), was previously patented by the inventors in U.S. Pat. No. 5,481,505 which is incorporated by reference herein.

There have been several prior art methods developed to solve the sonar problem of reducing noise from a loud, near-surface noise source while maintaining the signal level of signals produced by the target of interest (TOI). As used herein, the phrases "near-surface noise source" or "near-surface source" refer to an object (e.g., ship) that is primarily located on or near the ocean surface. An intensive effort has been directed to the area of adaptive beamforming, as evidenced by the development of the well known minimum variance distortion response (MVDR) algorithms. For ideal ocean conditions, when the spatial coherence of the acoustic field is known exactly, MVDR algorithms are optimum in minimizing the total noise field while maintaining the target of interest's signal level constant. However, there is only a finite time to estimate the acoustic field spatial coherence. Furthermore, errors between the actual and estimated acoustic field spatial coherence degrade the performance of MVDR algorithms rapidly because MVDR algorithms are highly non-linear. MVDR algorithms require the calculation of the inverse matrix of the acoustic field spatial coherence spectral matrix (CSM). Small errors in the estimate of CSM can propagate to become very large errors in the estimate of the inverse matrix of CSM. The CSM is defined as the matrix of all cross-product pairs of individual hydrophone time series Fast Fourier Transforms (FFTs). The CSM is described in detail in commonly owned U.S. Patent No. 5,481,505. Therefore, MVDR algorithms are not robust in realistic open ocean environments, and are severely degraded when short averaging times must be used in tactical sonar systems.

A second class of prior art algorithms developed to address the aforementioned problem is referred to as the WHISPR family of processing algorithms. The WHISPR-related algorithms are relatively large. These algorithms rely on one physical principle: the acoustic time series of a near-surface noise source has a significantly greater time variance than the acoustic time series from a submerged target of interest due to the Lloyd's Mirror effect and several other causes. Although WHISPR has shown some promise on selected acoustic data sets, it has never been developed into a real time system because it is not robust in real ocean environments.

U.S. Pat. No. 6,424,596 is directed to a method and system for significantly reducing the acoustic noise from near-surface sources using an array processing technique that utilizes multiple signal classification (MUSIC) beamforming and the Lloyd's Mirror interference pattern at very low frequencies. Noise from nearby near-surface sources, such as merchant ships, super tankers, fishing trawlers, seismic profiling platforms, or other sources near the ocean surface can significantly interfere with the detection and tracking of a quiet target-of-interest (TOI) located well below the ocean surface. The '596 invention reduces the noise of the near-surface sources, without degrading the signal level and quality of the TOI, by utilizing a unique application of the MUSIC beamforming process to separate the noise and signal subspace. Next, eigenvalue beamforming is used to reduce narrowband energy in selected frequency bins wherein the near-surface noise is radiating. Next, predetermined frequency and magnitude variance parameters are used to eliminate broadband noise emanating from the near-surface sources.

However, these prior inventions do not allow a sonar system to selectively reduce sound emanating from an object at a known azimuth and bearing in order to enhance sound emanating from an object of interest.

SUMMARY OF THE INVENTION

Therefore, it is an object of the present invention to provide a system that suppresses the noise from underwater noise sources of all types.

Another object of the present invention is to improve detection of signals present in noisy backgrounds.

In addition, it is an object of the present invention to provide a system having improved detection of signals of interest emanating from submerged objects.

Accordingly, the current invention provides a method and apparatus for suppressing identified noise sources. This includes receiving a plurality of signals from an array of sensors and transforming each of these signals to the frequency domain. The transformed signals are beamformed so that noise sources can be identified by bearing and frequency range. A planewave-fit noise-suppression routine is then used to remove identified noise sources from the transformed signals and to provide a noise-suppressed transformed signal having signals from said identified noise sources suppressed.

BRIEF DESCRIPTION OF THE DRAWINGS

The appended claims particularly point out and distinctly claim the subject matter of this invention. The various objects advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

The present invention is an extension of the invention described in U.S. Pat. No. 5,481,505, which is herein incorporated by reference. The present invention utilizes tracker inputs from the "Eight Nearest Neighbor Peak Picker (ENNPP)" which is completely described in U.S. Patent 5,481,505. For the sake of brevity, the details of the operation of the system of U.S. Pat. No. 5,481,505, although applicable to the present invention, are not repeated herein, but rather are referenced as needed. While the current invention was conceived as an improvement to U.S. Pat. No. 5,481,505, it should be evident that it is applicable to any system providing bearing and azimuth inputs to the algorithm.

In general, the technique of the present invention determines the phases and amplitudes of the noise sources to be suppressed by modeling the noise sources as planewave time series whose amplitudes and phases are determined from the measured time series input and the bearing-time and frequency time history of the noise sources to be suppressed. Detection is enhanced for passive sonar systems after noise suppression, especially if the Fourier Integral Method (FIM) algorithm is used as the beamforming method. The present invention may be furthered described with reference to FIG. 1.

Figure 1:
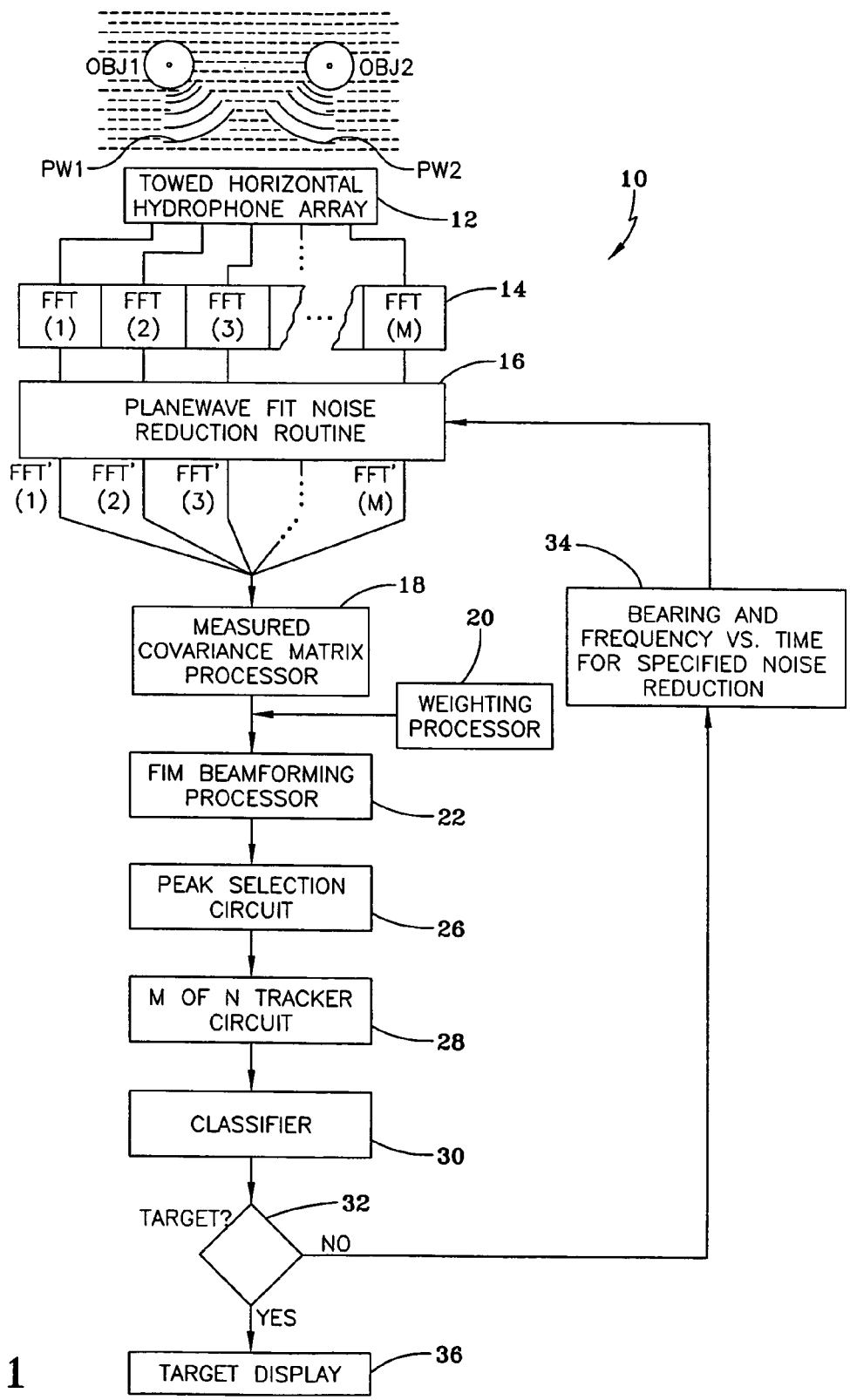
FIG. 1 is a block diagram of the noise suppression system of the current system.

The apparatus 10 shown in FIG. 1 includes a horizontal hydrophone line array 12 having M hydrophones that receives acoustic signals in the water for all potential sources including any underwater noise sources of other objects. OBJ1 and OBJ2 represent two objects that produce acoustic signals that radiate as multiple planewaves PW1 and PW2 respectively. Fast Fourier Transform (FFT) processors 14, shown as individual processors FFT(1), FFT(2), FFT(3) . . . FFT (M) inclusively, process signals from the corresponding waveforms of M spaced hydrophones in the array 12. Planewave-fit noise reduction routine 16 receives frequency domain output signals from the FFT processors 14. Routine 16 provides modified frequency domain output signals FFT'(1), FFT'(2), FFT'(3) . . . FFT'(M). A conventional measured covariance matrix processor 18 receives the modified output signals from routine 16. The covariance matrix processor 18 output can be weighted by a weighting processor 20. The weighted covariance processor output is provided to an inverse-beamforming planewave beamformer processor 22 for producing an estimated bearing to a selected object, OBJ1 or OBJ2.

The remaining portions of the apparatus 10 utilize the estimated bearing signal from the inverse beamforming planewave beamformer 22 covariance matrix data supplied by the measured covariance matrix processor 18 to produce beam output values.

Inverse beamforming processor 22 uses the output of the measured covariance matrix processor 18 in its original or weighted form, thereby forming beam levels in all frequency bins and at a selected number of bearings every FFT averaging time. A peak selection circuit 26 selects those incremental locations that exhibit a maximum with respect to adjacent incremental locations. The foregoing processors operate iteratively over time.

An "M of N" tracker circuit 28 comprises a processor that utilizes the succession of signals from the peak selection circuit 26 during each iteration to eliminate false targets and enable a target classifier 30 to select classification 32 of a source object as a target or a noise source. This can also be performed by a user. When an object is identified as a noise source, bearing and frequency range data 34 is provided to planewave-fit noise reduction routine 16. A target display 36 provides the track of the bearing, range and depth of each target over time.

The peak selection circuit 26 can be realized as an eight nearest-neighbor-peak picker as fully described in the U.S. Pat. No. 5,581,505. Application of this circuit results in the detection of all the peaks with relative maxima in beamformed levels on the beamformed FRAZ surface for a given time epoch, also more fully described in U.S. Pat. No. 5,481,505. A peak or relative maxima, beam level can be described by the following parameters: level; frequency; azimuth angle; azimuthal angle width; elevation angle; elevation angle width; and time location.

Beam Level on the FRAZ surface as a function of time is input to the ENNPP and tracked by the Inverse Beamforming M of N tracker circuit 20 in a manner more fully described in U.S. Pat. No. 5,481,505. Since sources of interest in detection are assumed to be distant point sources, azimuthal angle width and elevation angle width are not used in the peak picking process of the present invention.

The noise-suppression algorithm performs the noise suppression every FFT time epoch using the following mathematical relationship:

$$\overline{FFT}(M) = FFT(M) - X(m, (k^i_a k^i_b), (l_a, l_b))$$

Where:

m is the hydrophone index, $1 \leq m \leq M$, $(k^i_a, k^i_b)$ are the I frequency indices over which noise suppression is desired, $(l_a, l_b)$ are the bearing indices over which noise suppression is desired, FFT(m) is the original hydrophone FFT, $\overline{FFT}(m)$ is the residual hydrophone FFT after noise suppression, X( ) is equal to $X^I$( ) for a one planewave-fit and equals $X^{II}$(°) for a two planewave-fit.

The $X^I$( ) is determined adaptively each FFT time epoch by fitting a planewave model with arbitrary complex amplitude, $a_k$, noise source arrival direction u=cos(θ) (where θ is the arrival angle relative to forward end fire (θ=0) on a line array) to measured FFT data. The best fit for the model is defined as the $\{a_k\}$ and u that minimize the error between the model output and the data. The search space consists of all possible complex amplitudes in frequency intervals $(k^i_a, k^i_b)$ and over all possible bearings in the angular sector of interest.

The desired noise source bearing indices $(l_a, l_b)$ are set equal to the planewave model $$X^l = a_k \exp\left[-\frac{i2\pi k x(m) u}{Nc\Delta}\right] \quad (2)$$

where $a_k$ and u have been determined by the search described below. This procedure is repeated every FFT time epoch. In equation 2, k is the frequency bin number with $(k^i_a, k^i_b)$. (Note that $\overline{FFT}(m) \equiv FFT(m)$ when k is not within the fitted frequency bin intervals $(k^i_a, k^i_b)$.) The incoming sound is a continuous pressure field $\bar{p}(t,x)$ at time t and location x. N is the number of time series points in the FFT time epoch (FFT size). $\Delta$ is the sampling interval in seconds between two adjacent points in the input time series. For each time epoch, t, N samples are collected, with each sample n being taken at a time $\Delta$ from the previous sample. Thus, time epoch, $t=n\Delta$ for $n=0:N-1$.

Samples are also taken for each hydrophone along a linear array of hydrophones. x(m) is the position of the mth hydrophone in the linear array. c is the speed of sound in water. Thus, spatial samples are taken at locations $x=x(m)$ for $m=0:M-1$ where x is the location which is a function of the hydrophone index m, for a total of M hydrophones. In these equations, the colon symbol J:K is used to denote $\{J, J+1, \ldots, K\}$ with $J \leq K$. The total discrete data available is $p(n,m) \equiv \bar{p}(n\Delta, x(m))$ for $n=0:N-1, m=0:M-1$.

In further detail, amplitudes $\{a_k\}$ are determined in accordance with the following principles. If a single planewave arrives from angle $u_1 = \sin\theta_1$, comprised of frequencies $\{f_1(k)\}^{k_b}_{k_a}$, the observed complex pressure field $\bar{p}_1(t,x)$ is modeled as $$\bar{p}_1(t, x) = \sum_{k=k_a}^{k_b} a_1(k) \exp\left[i 2\pi f_1(k)\left(t - \frac{x}{c} u_1\right)\right], \quad (3)$$

where the amplitudes $\{a_1(k)\}^{k_b}_{k_a}$ are complex. For given frequencies $\{f_1,(k)\}^{k_b}_{k_a}$, the amplitudes are chosen so that the weighted fitting error e is minimized. Here, error e is defined as $$e = \sum_{n=0}^{N-1} \sum_{m=0}^{M-1} w_t(n) w_x(m) |p(n,m) - \bar{p}_1(n\Delta, x(m))|^2 \quad (4)$$

$$= \sum_{n,m} w_t(n) w_x(m) \left|p(n,m) - \sum_k a_1(k) \exp\{i\alpha_1(k)[n - \beta(m)u_1]\}\right|^2,$$

where $p(n,m)$ represents samples of the actual data, $\bar{p}_1(n\Delta, x(m))$ represents the fitted data samples, and the temporal and spatial weightings $\{w_t(n)\}$ and $\{w_x(m)\}$ are real and positive, and the known dimensionless parameters $$\alpha_1(k) \equiv 2\pi f_1(k)\Delta, \quad \beta(m) \equiv \frac{x(m)}{c\Delta}. \quad (5)$$

The temporal and spatial windows are given as:

$$W_t(\alpha) = \sum_{n=0}^{N-1} w_t(n) \exp(-i\alpha n) \text{ for all } \alpha, W_t(0) = 1, \quad (6)$$

$$W_x(\gamma) = \sum_{m=0}^{M-1} w_x(m) \exp(i\beta(m)\gamma) \text{ for all } \gamma, W_x(0) = 1, \quad (7)$$

and the two-dimensional data spectrum is defined as $$P(\alpha, \gamma) = \sum_{n,m} w_t(n) w_x(m) p(n,m) \exp[-i\alpha n + i\beta(m)\gamma] \text{ for all } \alpha, \gamma. \quad (8)$$

The optimal complex amplitudes $\{\underline{a}_1(k)\}^{k_b}_{k_a}$ for equation 4 must satisfy the simultaneous linear equations $$\sum_{k=k_a}^{k_b} \underline{a}_1(k) W_1(\alpha_1(\underline{k}) - \alpha_1(k)) W_x([\alpha_1(\underline{k}) - \alpha_1(k)] u_1) = \quad (9)$$

$$P(\alpha_1(\underline{k}), \alpha_1(\underline{k}) u_1), \text{ for } \underline{k} = k_a : k_b.$$

For flat temporal weighting:

$$w_t(n) = \frac{1}{N} \text{ for } n = 0 : N-1, \quad (10)$$

and fitting frequencies $$f_1(k) = \frac{k}{N\Delta} \text{ for } k = k_a : k_b, \alpha_1(k) = 2\pi k / N, \quad (11)$$

we can write an explicit solution to equation 9 for the optimal amplitudes, namely, $$\underline{a}_1(k) = P(\alpha_1(k), \alpha_1(k) u_1) \text{ for } k = k_a : k_b. \quad (12)$$

The corresponding optimal (minimum) error is then expressible as $$\underline{e} = \sum_{n,m} w_t(n) w_x(m) |p(n,m)|^2 - \sum_k |P(\alpha_1(k), \alpha_1(k) u_1)| \quad (13)$$

The last term of this quantity e is redefined as follows:

$$\sum_k |P(a_1(k), \alpha_1(k)u_1| \equiv r(u_1)/N^2 \qquad (13a)$$

Figure 2:
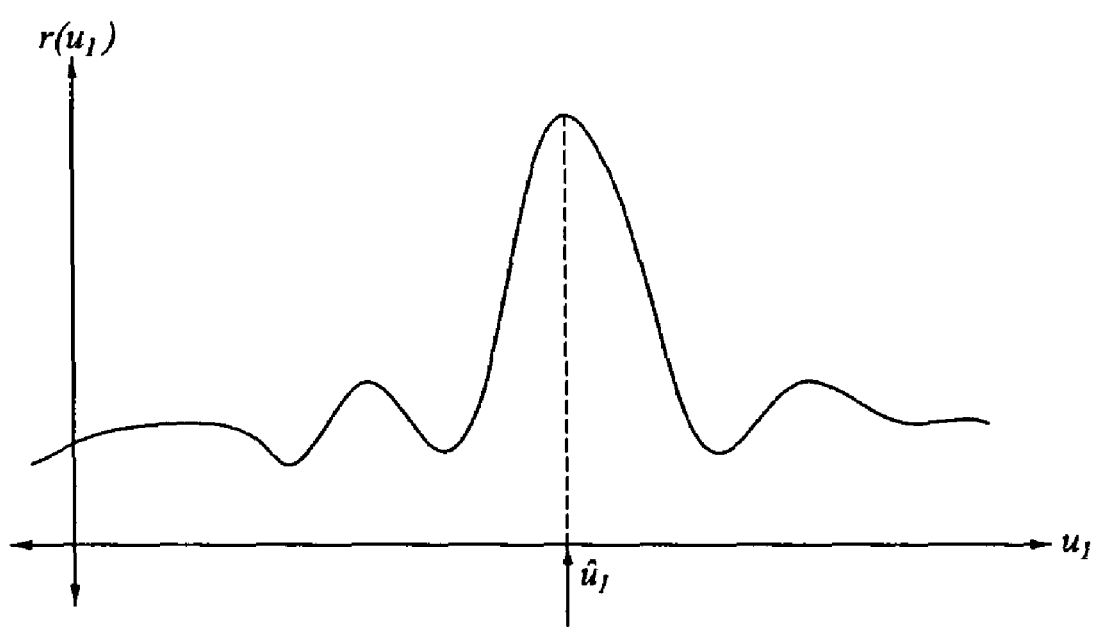
FIG. 2 is a graph showing maximization of the response function for a given bearing vector.

We now further minimize the error e by choosing the planewave arrival angle $u_1$ that maximizes $r(u_1)$, resulting in $$r(u_1) = \sum_{k=k_a}^{k_b} \left| \sum_{m=0}^{M-1} w_x(m) q(k,m) \exp\left[ i\frac{2\pi k}{N} \beta(m)u_1 \right] \right|^2, \qquad (14)$$

where $$q(k,m) = \frac{1}{N} \sum_{n=0}^{N-1} p(n,m) \exp(-i2\pi k n/N) \text{ for } k = 0: N-1, \qquad (15)$$

$$m = 0: M-1$$

is the temporal discrete Fourier transform of the m-th element data. The maximization of $r(u_1)$ by choice of $u_1$ is depicted in FIG. 2. Equation 14 provides guidance as to the preferred processing. The time-space data {p(n,m)} is first transformed into the frequency-space domain {q(k,m)}, and then for the hypothesized arrival angle $u_1$, the m-th element component in frequency bin k is scaled and phase-shifted by $(2\pi k/N)\beta(m)u_1$. This phase shift exactly compensates for that of a single frequency planewave arriving at angle $u_1$:

$$phaseshift(k,m) = -2\pi \frac{k}{N\Delta} \frac{x(m)}{c} u_1 = \frac{2\pi k}{N} \beta(m)u_1. \qquad (16)$$

Thus, the inner complex sum over m in equation 14 is a coherent one for any planewave arriving at angle $u_1$. Finally, the outer sum over k in equation 14 is an incoherent sum over frequencies in the band of interest. This incoherent sum is necessary because no interrelations have been assumed for individual frequency components in the planewave arrivals. After the sum over k is complete, then $r(u_1)$ is plotted for all $u_1$ in the angular sector of interest and its maximum is located at $\hat{u}_1$. The complex sum on element number m in equation 14 cannot be accomplished by a Fast Fourier Transform (FFT) because, in general, $\beta(m)=x(m)/(c\Delta)$ is not linear in m for an unequally spaced line array, but it is linear for a sparse equispaced line array. This complex sum must be carried out by brute force. However, one shortcut available uses the recursion $$\exp\left[ i\frac{2\pi k}{N} \beta(m)u_1 \right] = \exp\left[ i\frac{2\pi(k-1)}{n} \beta(m)u_1 \right] \exp\left[ i\frac{2\pi}{N} \beta(m)u_1 \right] \qquad (17)$$

for each m and $u_1$ to generate the k-values needed for the exponentials.

Finding the best spatial weights {$w_x(m)$} is not trivial; they should not simply be taken as flat but should reflect known element locations {x(m)}. A Hann shading can be used for this.

After the conditionally best coefficients {$a_1(k)$} are found for a specified $u_1$, the minimal conditional time-space residual is, from equations 3 and 4, $$p(n,m) \equiv \tilde{p}(n\Delta, x(m)) - \tilde{p}_1(n\Delta, x(m)) \qquad (18)$$

$$= p(n,m) - \sum_k a_1(k) \exp\left[ -i\frac{2\pi k}{N}(n - \beta(m)u_1) \right].$$

The corresponding FFT of this residual is, from equation 15, $$q(k,m) = \frac{1}{N} \sum_{n=0}^{N-1} p(n,m) \exp(-i2\pi k n/N) \qquad (19)$$

$$= q(\underline{k},m) - \frac{1}{N} \sum_{k=k_a}^{k_b} a_1(k) \exp\left[ -i\frac{2\pi k}{N} \beta(m)u_1 \right] \underbrace{\sum_{n=0}^{N-1} \exp[-i2\pi(\underline{k}-k)n/N]}_{N\delta(\underline{k}-k)}$$

$$= q(\underline{k},m) - a_1(\underline{k}) \exp\left[ -i\frac{2\pi k}{N} \beta(m)u_1 \right], \text{ for } \underline{k} = k_a: k_b.$$

The conditionally optimal amplitudes are, from equations 8, 10, 11, 12 and 15, $$a_1(k) = P(\alpha_1(k), \alpha_1(k)u_1) \qquad (20)$$

$$= \sum_{M=0}^{M-1} w_x(m) q(k,m) \exp\left[ i\frac{2\pi k}{N} \beta(m)u_1 \right] \text{ for } k = k_a: k_b.$$

These complex amplitudes should be evaluated only after the best arrival angle $u_1$ (namely $\hat{u}_1$) has been determined. Then, equation 23 should be evaluated, using $\hat{u}_1$ in place of $u_1$. That is, the unconditionally optimum amplitudes are $$\hat{a}_1(k) = P(\alpha_1(k), \alpha_1(k)\hat{u}_1) \qquad (21)$$

$$= \sum_{M=0}^{M-1} w_x(m) q(k,m) \exp\left[ i\frac{2\pi k}{N} \beta(m)\hat{u}_1 \right] \text{ for } k = k_a: k_b,$$

and the minimal residual in the frequency-space domain is $$q(k,m) = \qquad (22)$$

$$\begin{cases} q(k,m) - \hat{a}_1(k) \exp\left[ -i\frac{2\pi k}{N} \beta(m)\hat{u}_1 \right] & \text{for } k = k_a: k_b, \\ q(k,m) & \text{for } k \notin k_a: k_b. \end{cases}$$

Letting the spatially weighted FFT at frequency bin k be defined as $$q_w(k,m) = q(k,m) w_x(m), \qquad (23)$$

and its spatial autocorrelation for frequency bin k be defined as $$\phi(k, j) = \sum_m q_w(k, m) q_w^*(k, m - j), \quad (24)$$

then, from equation 12, if x(m)=dm (equally spaced line array), $$r(u_1) = \sum_{k=k_a}^{k_b} \left| \sum_{m=0}^{M-1} q_w(k, m) \exp\left[i \frac{2\pi k}{N} \frac{dm}{c\Delta} u_1\right] \right|^2 \quad (25)$$

$$= \sum_{k=k_a}^{k_b} \sum_{j=1-M}^{M-1} \phi(k, j) \exp\left(i \frac{2\pi k}{N} \frac{d}{c\Delta} j u_1\right).$$

A FIM-like generalization would be to weight the spatial sum over j to obtain the modification $$r_s(u_1) = \sum_{k=k_a}^{k_b} \sum_{j=1-M}^{M-1} w_s(j) \phi(k, j) \exp\left(i \frac{2\pi k}{N} \frac{d}{c\Delta} j u_1\right), \quad (26)$$

where the $\{w(j)\}_{M-11-M}$ are separation weights (real and even about j=0).

The two planewave-fit function, $X^{II}$, is determined in a similar way to the one planewave-fit function, except that there are assumed to be two coherent planewaves interfering with within the frequency interval $(k^i_a, k^i_b)$ and bearing interval $(l_a, l_b)$ Therefore, $X^{II}$ is given by:

$$X^{II} = a_k^{(1)} \exp\left[-\frac{i2\pi k x(m) u^{(1)}}{Nc\Delta}\right] + a_k^{(2)} \exp\left[-\frac{i2\pi k x(m) u^{(2)}}{Nc\Delta}\right] \quad (27)$$

and the best fit to the data requires a coherent four-parameter search in two complex amplitude number sets $\{a^{(1)}{}_k\}$ and $\{a^{(2)}{}_k\}$ and in two real angles, $u^{(1)}$ and $u^{(2)}$, for the two planewaves arrivals. In this way, the two planewaves are allowed to interfere with one another coherently. The process to determine $X^{II}$ is repeated every FFT time epoch.

In deriving this search, the data available is again {p(n, m)} for n=0:N−1 and m=0:M−1, and the fitting frequencies are $$f_k = \frac{k}{T} = \frac{k}{N\Delta} \text{ for } k = k_a : k_b. \quad (28)$$

The range $(k_a, k_b)$ represents the common frequencies for the two planewave-fits. It is possible to generalize to the case where only some of the frequencies $\{f_k\}$ are common to the two planewaves; the corresponding complex amplitudes $\{a_1(k)\}$ and $\{a_2(k)\}$ would then be set to zero in the appropriate frequency bins.

If two planewaves arrive from angles $u_1$ and $u_2$, the observed complex pressure field over observation interval T=NΔ is modeled as $$\hat{p}(t, x) \equiv \sum_{k=k_a}^{k_b} a_1(k) \exp\left[i 2\pi \frac{k}{T}\left(t - \frac{x}{c} u_1\right)\right] + \quad (29)$$

$$\sum_{k=k_a}^{k_b} a_2(k) \exp\left[i 2\pi \frac{k}{T}\left(t - \frac{x}{c} u_2\right)\right],$$

where the amplitudes $\{a_1(k)\}$ and $\{a_2(k)\}$ are complex. The two sources are assumed to be uncorrelated with each other. The sampled pressure field is $$\hat{p}(n\Delta, x(m)) = \sum_{k=k_a}^{k_b} a_1(k) \exp[i\alpha_k (n - \beta(m) u_1)] + \quad (30)$$

$$\sum_{k=k_a}^{k_b} a_2(k) \exp[i\alpha_k (n - \beta(m) u_2)].$$

An average squared error is defined between the data and the model as:

$$e = \frac{1}{N} \sum_{n,m} w_x(m) |\hat{p}(n\Delta, x(m)) - \hat{p}(n\Delta, x(m))|^2, \quad (31)$$

where we utilize flat temporal weighting $w_t(n)=1/N$, and allow a spatial error-weighting function $w_x(m)$, which is real and positive. Then the error e can be expressed in the form:

$$e = \frac{1}{N} \sum_{n,m} w_x(m) \left| p(n, m) - \sum_{k=k_a}^{k_b} a_1(k) \exp[i\alpha_k (n - \beta(m) u_1)] - \right. \quad (32)$$

$$\left. \sum_{k=k_a}^{k_b} a_2(k) \exp[i\alpha_k (n - \beta(m) u_2)] \right|^2$$

$$= \frac{1}{N} \sum_{n,m} w_x(m) |d(n, m)|^2 = \sum_m w_x(m) \frac{1}{N} \sum_n |d(n, m)|^2.$$

Letting the FFT be a discrete FFT:

$$D(l, m) = \sum_{n=0}^{N-1} \exp(-i 2\pi n l / N) d(n, m) \text{ for } l = 0 : N - 1 \quad (33)$$

it follows that $$\frac{1}{N^2} \sum_{l=0}^{N-1} |D(l, m)|^2 = \frac{1}{N} \sum_{n=0}^{N-1} |d(n, m)|^2, \quad (34)$$

which is a discrete form of Parseval's Theorem. The error e follows from equation 32 as $$e = \sum_m w_x(m) \frac{1}{N^2} \sum_l |D(l, m)|^2. \quad (35)$$

But from equations 32 and 33, $$\frac{1}{N} D(l, m) = \quad (36)$$
$$q(l, m) - a_1(l)\exp[-i\alpha_1\beta(m)u_1] - a_2(l)\exp[-i\alpha_1\beta(m)u_2]$$

for l=0:N−1, m=0:M−1. Therefore the error e in equation 35 becomes $$e = \sum_m w_x(m) \quad (36)$$
$$\sum_l |q(l, m) - a_1(l)\exp[-i\alpha_1\beta(m)u_1] - a_2(l)\exp[-i\alpha_1\beta(m)u_2]|^2.$$

Define functions $$X(k, \gamma) \equiv \sum_m w_x(m) q(k, m) \exp[i\gamma\beta(m)] \text{ for } k = k_a : k_b, \text{ all } \gamma, \quad (37)$$

$$W_x(\gamma) \equiv \sum_m w_x(m) \exp[i\gamma\beta(m)] \text{ for all } \gamma. \quad (38)$$

Minimization of error e results in simultaneous equations for the best fitting coefficients $\{\underline{a}_1(k)\}$ and $\{\underline{a}_2(k)\}$, namely, $$\begin{aligned}\underline{a}_1(k) + W_k \underline{a}_2(k) &= X(k, \alpha_k u_1) \\ W_k^* \underline{a}_1(k) + \underline{a}_2(k) &= X(k, \alpha_k u_2)\end{aligned} \bigg\} \text{for } k = k_a : k_b, \quad (39)$$

where $W_k \equiv W_x(u_1-u_2)$. The solutions for the optimal amplitudes are, for $k=k_a:k_b$, $$\underline{a}_1(k) = \frac{X(k, \alpha_k u_1) - W_k X(k, \alpha_k u_2)}{1 - |W_k|^2}, \quad (40)$$

$$\underline{a}_2(k) = \frac{X(k, \alpha_k u_2) - W_k^* X(k, \alpha_k u_1)}{1 - |W_k|^2}. \quad (41)$$

Decoupling in frequency index k occurs due to the flat temporal weighting and the fact that frequency increment $\Delta f = 1T$. The optimum value of error e is now, from equation 36, $$e = \sum_m w_x(m) \sum_k \{q(k, m) - \underline{a}_1(k)\exp[-i\alpha_k\beta(m)u_1] - \quad (42)$$
$$\underline{a}_2(k)\exp[-i\alpha_k\beta(m)u_2]\} q*(k, m)$$

-continued
$$= \sum_{m,k} w_x(m) |q(k, m)|^2 - \sum_k \underline{a}_1(k) X*(k, \alpha_k u_1) - \sum_k \underline{a}_2(k) X*$$
$$(k, \alpha_k u_2)$$
$$= \sum_{m,k} w_x(m) |q(k, m)|^2 - \tau(u_1, u_2),$$

where we have used the solutions for $\underline{a}_1(k)$ and $\underline{a}_2(k)$ from equations 40 and 41, the fact that the initial sum over m and k is independent of $u_1$ and $u_2$, and defined function $$r(u_1, u_2) = \quad (43)$$
$$\sum_{k=k_a}^{k_b} \frac{\left\{\begin{array}{c}\left|X\left(k, \frac{2\pi k}{N} u_1\right)\right|^2 + \left|X\left(k, \frac{2\pi k}{N} u_2\right)\right|^2 - \\ 2\mathfrak{R}\left\{W_x\left(\frac{2\pi k}{N}(u_1 - u_2)\right) X*\left(k, \frac{2\pi k}{N} u_1\right) X\left(k, \frac{2\pi k}{N}\right) u_2\right\}\end{array}\right\}}{1 - \left|W_x\left(\frac{2\pi k}{N}(u_1 - u_2)\right)\right|^2}$$

Here $\mathfrak{R}$ denotes the real part, and from equations 37 and 38 we have function values $$X\left(k, \frac{2\pi k}{N} u\right) = \sum_{m=0}^{M-1} w_x(m) q(k, m) \exp\left[i \frac{2\pi k}{N} \frac{x(m)}{c\Delta} u\right], \quad (44)$$

$$W_x\left(\frac{2\pi k}{N} u\right) = \sum_{m=0}^{M-1} w_x(m) \exp\left[i \frac{2\pi k}{N} \frac{x(m)}{c\Delta} u\right], \quad (45)$$

$$q(k, m) = \frac{1}{N} \sum_{n=0}^{N-1} p(n, m) \exp(-i 2\pi k n/N) \text{ for } m = 0 : M - 1 \quad (46)$$

which are defined for k=0:N−1. However, only the values for $k=k_a:k_b$ are needed. Equation 46 consists of M N-point temporal discrete Fourier transforms.

To further minimize e in equation 42, we must maximize the quantity $r(u_1,u_2)$ given by equation 43 by choice of both arrival angles $u_1$ and $u_2$. We may take $u_1<u_2$ without loss of generality. Let $\hat{u}_1, \hat{u}_2$ be the location of the maximum of $r(u_1,u_2)$.

The factor $$\frac{2\pi k}{N} \frac{x(m)}{c\Delta} u$$

in equation 44 is exactly the phase compensation required at frequency $$\frac{k}{N\Delta}$$

and array element m, in order to coherently "line up" all components arriving at angle u (u=0 is broadside). Thus, equation 44 is a "coherent" sum done prior to the "incoherent" sum over k (frequency) in equation 43. The sum in equation 45 cannot be done a priori in closed form because of the irregular element locations {x(m)}; also $W_x(\gamma)$ is complex and will remain so for general array element locations {x(m)}.

Notice, from equation 43, that for given arrival angles $u_1, u_2$ and index k, only three complex quantities need be computed. However, they must be combined according to equation 43, yielding a purely real quantity, which is then summed over the frequency band of interest, $k=k_a:k_b$. Equations 44 and 45 cannot be done with the fast Fourier transform because the element locations {x(m)} are presumed unevenly spaced.

A measure of the total power in arrival 1 is available, by reference to equation 18 as $$P_1 = \sum_{k=k_a}^{k_b} |\hat{a}_1(k)|^2, \quad (47)$$

where $\{\hat{a}_1(k)\}$ are the optimal coefficients obtained from equations 40 and 41, using $\hat{u}_1$ and $\hat{u}_2$, after the best angles, namely, $\hat{u}_1$ and $\hat{u}_2$, have been determined from the maximization of $r(u_1,u_2)$ given by equation 43. If $P_1$ is large, then source 1 could be coherently subtracted from the total input. If $P_1$ is small, then the coefficients $\{\hat{a}_1(k)\}$ could be discarded and considered as noise.

With the optimal coefficients $\{\hat{a}_1(k)\}$ and $\{\hat{a}_2(k)\}$ for specified $u_1$ and $u_2$ the minimal residual is, using equation 30, $$\underline{p}(n,m) \equiv p(n,m) - \hat{p}(n\Delta, x(m)) \quad (48)$$
$$= p(n,m) - \sum_k \underline{a}_1(k)\exp\left[i\frac{2\pi k}{N}(n-\beta(m)u_1)\right] -$$
$$\sum_k \underline{a}_2(k)\exp\left[i\frac{2\pi k}{N}(n-\beta(m)u_2)\right].$$

The corresponding residual in the frequency-space domain, using equation 46 and the best angles $\hat{u}_1$ and $\hat{u}_2$, is $$\underline{\hat{q}}(k,m) = q(k,m) - \underline{\hat{a}}_1(k)\exp\left[-i\frac{2\pi k}{N}\beta(m)\hat{u}_1\right] - \quad (49)$$
$$\hat{a}_2(k)\exp\left[-i\frac{2\pi k}{N}\beta(m)\hat{u}_2\right] \text{ for } k=k_a:k_b.$$

This residual is devoid of the two strongest planewave arrivals and can now be processed further in order to detect additional weak arrivals. Without this coherent subtraction, the two strong arrivals could override a weak arrival in close angular proximity.

The processing after noise suppression proceeds with the new FFT(m) determined from equations 1, 2, and 3 being input to the measured covariance matrix processor 16 in FIG. 1.

Processing can be performed over any frequency interval of interest, but utilizes a minimum frequency bin size for digital processors since most data processors are digital and the frequency spectrum of a beam output is generated by a fast Fourier Transform (FFT) (For analog processors, bandwidth can be any arbitrary value.)

Peaks found by the above algorithm are processed with the M-of-N tracker circuits 22 more fully described in U.S. Pat. No. 5,481,505.

The advantage of noise suppression is to improve detection of signals in noisy background by reducing noise levels coherently without decreasing the desired signal levels. Signals of interest in this case are submarines operating submerged and producing signals of generally low levels. Noise comes from various sources including surface shipping, wind, waves, marine life, seismic activity, and seismic profilers. The noise sources originating from the sea surface, shipping, wind, waves, and seismic profiling will be suppressed significantly in level, by the application of the algorithms detailed herein. This use of noise suppression in the practice of the present invention, therefore, improves detection of submerged signals of interest.

It will be understood that various changes in the detail, steps and arrangement of parts, which have been herein described and illustrated, in order to explain the nature of the invention, may be made to those skilled in the art with the principle and scope of the invention as expressed in the independent claims.

What is claimed is:

1. An apparatus comprising:
   means for reducing planewave noise having a plurality of frequency domain inputs for receiving frequency domain signals, said means for reducing planewave noise having a bearing and frequency range input, and said means for reducing planewave noise having noise reduced frequency domain outputs; and
   means for providing noise parameters having a bearing output and a frequency range output joined to said means for reducing planewave noise bearing and frequency range inputs, said bearing output and frequency range output being provided for identifying a noise source;
   said means for reducing planewave noise providing noise reduced frequency domain outputs having signals from the identified noise source reduced.

2. The apparatus of claim 1 further comprising:
   an array of sensors providing time domain signals; and
   a plurality of transform processors with one processor joined to each said sensor for changing the time domain data to frequency domain signals, said plurality of transform processors being joined to said means for reducing planewave noise for providing the frequency domain signals.

3. The apparatus of claim 2 wherein:
   said array of sensors comprises a linear array of hydrophones; and
   said plurality of transform processors comprises a plurality of Fourier transform processors.

4. The apparatus of claim 3 wherein said means for providing noise parameters comprises:
   a means for estimating connected to said plurality of transform processors for estimating the bearing to a noise source;
   means for generating beam values for frequency domain signals detected from different locations along the linear array of hydrophones at incremental ranges and depths along the estimated bearing;
   a means for selecting a location joined to said means for generating beam values for selecting a bearing and frequency range of a noise source with peak beam value; and a means for providing the bearing and frequency range of the noise source to said means for reducing planewave noise.

5. The apparatus of claim 1 wherein said means for reducing planewave noise estimates signals from the identified noise source for subtraction from the received frequency domain signals to produce the noise reduced frequency domain outputs.

6. The apparatus of claim 5 wherein said means for reducing planewave noise utilizes a one planewave-fit calculation to estimate signals from the identified noise source.

7. The apparatus of claim 5 wherein said means for reducing planewave noise utilizes a two planewave-fit calculation to estimate signals from the identified noise source.

* * * * *